(12) United States Patent
Wilcox et al.

(10) Patent No.: US 11,378,931 B2
(45) Date of Patent: Jul. 5, 2022

(54) METHODS AND APPARATUS FOR MANUFACTURING A PLURALITY OF PARTS WITH TOOL PATH CORRECTION

(71) Applicant: Hexagon Technology Center Gmbh, Heerbrugg (CH)

(72) Inventors: William Wilcox, New York, NY (US); David Jeffers, Weddington, NC (US)

(73) Assignee: Hexagon Technology Center GmbH, Heerbrugg (CH)

( * ) Notice: Subject to any disclaimer, the term of this patent is extended or adjusted under 35 U.S.C. 154(b) by 212 days.

(21) Appl. No.: 16/434,101

(22) Filed: Jun. 6, 2019

(65) Prior Publication Data

US 2019/0377317 A1 Dec. 12, 2019

Related U.S. Application Data

(60) Provisional application No. 62/682,426, filed on Jun. 8, 2018.

(51) Int. Cl.
*G05B 19/19* (2006.01)
*G05B 19/4093* (2006.01)

(52) U.S. Cl.
CPC ....... *G05B 19/19* (2013.01); *G05B 19/40931* (2013.01); *G05B 2219/35012* (2013.01); *G05B 2219/49372* (2013.01)

(58) Field of Classification Search
CPC .............. G05B 19/19; G05B 19/40931; G05B 2219/35012; G05B 2219/49372; G05B 19/401; G05B 19/404; G05B 19/4083
See application file for complete search history.

(56) References Cited

U.S. PATENT DOCUMENTS

| 4,428,055 A * | 1/1984 | Zurbrick | G05B 19/4015 |
| | | | 702/56 |
| 4,784,541 A * | 11/1988 | Umehara | G05B 19/4015 |
| | | | 409/193 |
| 4,881,021 A | 11/1989 | Hirai | |
| 8,476,547 B1 * | 7/2013 | Reed | B23H 11/003 |
| | | | 219/69.12 |
| 2015/0205290 A1 * | 7/2015 | Henning | B64C 39/024 |
| | | | 703/7 |

(Continued)

OTHER PUBLICATIONS

International Search Report and Written Opinion for Application No. PCT/US2019/035881, dated Nov. 27, 2019 (11 pages).

*Primary Examiner* — Ziaul Karim

(74) *Attorney, Agent, or Firm* — Nutter McClennen & Fish LLP

(57) ABSTRACT

A method of manufacturing a plurality of parts receives cutting instructions to produce a part based on a nominal model of the part. After cutting a given part, the method measures at least one particular feature of the given part with a coordinate measuring machine and subsequently calculates an error of the given part by determining an initial deviation between the cutting instructions and the nominal model. The cutting instructions are then adjusted based on the error to obtain updated cutting instructions, where the updated cutting instructions have a reduced deviation from the initial deviation with regard to the nominal model. The method then uses the updated cutting instructions to produce another part having a reduced error deviation from the nominal model.

21 Claims, 13 Drawing Sheets

(56) References Cited

U.S. PATENT DOCUMENTS

2015/0378347 A1* 12/2015 Sato ................... G05B 19/402
700/193
2016/0327931 A1   11/2016 Gu et al.

* cited by examiner ical embodiments of the invention relate to correcting error
METHODS AND APPARATUS FOR MANUFACTURING A PLURALITY OF PARTS WITH TOOL PATH CORRECTION

PRIORITY

This patent application claims priority from provisional U.S. patent application No. 62/682,426, filed Jun. 8, 2018, entitled, "METHOD AND APPARATUS FOR MACHINING A PLURALITY OF PARTS," and naming William Wilcox and David Jeffers as inventors, the disclosure of which is incorporated herein, in its entirety, by reference.

FIELD OF THE INVENTION

Illustrative embodiments of the invention generally relate to machining processes and parts produced and processed using machining processes and, more particularly, illustrative embodiments of the invention relate to correcting error in the machining process.

BACKGROUND OF THE INVENTION

Numerical Control (NC) cutting instructions for a machine tool, also known as a machining process/program, define the steps necessary for a machine tool to cut a part. These steps include various machining parameters, such as machine tool name, cutting path, cutting tools, work offsets, spindle speed, feed rate, etc. As known by those in the art, NC cutting instructions are often based on a nominal model or a design intent of a part.

After the part is produced using the NC cutting instructions, many processes inspect the part for imperfections. Accordingly, those in the art have developed inspection instructions to define the steps necessary to scrutinize the part to determine if the part was accurately produced to meet functional requirements and/or design intent.

SUMMARY OF VARIOUS EMBODIMENTS

In accordance with one embodiment of the invention, a method of manufacturing a plurality of parts receives cutting instructions to produce a part based on a nominal model of the part. The method then drives a machine tool with the cutting instruction to produce a given part, and subsequently measures the given part with a coordinate measuring machine by measuring at least one particular feature of the given part.

After measuring the given part, the method calculates an error map of the given part by determining an initial deviation between the cutting instructions and the nominal model. The initial deviation is a function of the measured at least one particular feature of the given part and a corresponding at least one particular feature of the nominal model. The cutting instructions are then adjusted based on the error map to obtain updated cutting instructions, where the updated cutting instructions have a reduced deviation from the initial deviation with regard to the nominal model. The method then uses the updated cutting instructions to produce another part.

In illustrative embodiments, the cutting instructions can further have a series of discrete points that coordinate a cutting path of a machine tool. Each of the discrete points has a coordinate set defined in a machine tool coordinate plane. Further, in some embodiments, calculating the error map includes calculating the deviation of the measured at least one particular feature from the corresponding at least one particular feature in a coordinate measuring machine coordinate plane for each of the at least one particular features, and adjusting the cutting instructions based on the error map includes adjusting at least one coordinate set of the cutting instruction in the machine tool coordinate plane.

In other embodiments, adjusting the cutting instructions can include identifying a particular set of the cutting instructions response for cutting the at least one particular feature of the given part, and adjusting the particular set of the cutting instructions to compensate for at least part of the initial deviation of the at least one particular feature of the given part. An initial deviation, calculated by the method, can include an error deviation magnitude and an error deviation direction for each of a plurality of points making up the at least one particular feature of the given part.

The method can further associate the at least one particular feature of the given part with a corresponding set of the cutting instructions using a relationship between the cutting instructions and the nominal model, and the measured at least one particular feature and particular feature of the nominal model. The at least one particular feature can include at least one of a line, a circle, a cylinder, or a plane.

In accordance with another embodiment of the invention, a method of producing a machined part directs use of electronic instructions for producing a given part. The instructions include a series of cutting instructions that coordinate a cutting path of a machine tool as a function of an electronic nominal model of the part. The method receives inspection results of the given part produced using the electronic instructions, where the inspection results show one or more error deviations from the nominal model. Each error deviation is associated with a particular feature of the given part as produced. Next, the method identifies a set of the cutting instructions associated with a particular feature of the given part, associates the error deviation(s) of the particular feature of the given part with the identified set of the cutting instructions, and edits the identified set of the cutting instructions to correct at least part of the error deviation(s) of the particular feature.

Directing the use of the electronic instructions for producing the given part can result in the given part having a series of particular features along the cutting path of the machine tool. In some instances, a particular feature can include a line, a circle, a cylinder, or a plane. An error deviation associated with a particular feature of the given part can include an error magnitude and an error direction associated with a discrete point of the particular feature.

The method can further identify a specific coordinate set of the cutting instructions response for forming a discrete point of the particular feature, associate an error deviation of the discrete point of the particular feature with the identified specific coordinate set, and edit the specific coordinate set of the cutting instructions to correct at least part of the associated error deviation.

In accordance with other embodiments, an apparatus for producing a machined part has an electronic interface configured to receive electronic instructions for producing a given part. The instructions include a series of cutting instructions that coordinate a cutting path of a machine tool as a function of an electronic nominal model of the part. The electronic interface also is configured to receive inspection results of the given part produced using the electronic instructions to show one or more error deviations from the nominal model. Each error deviation is associated with a particular feature of the given part as produced.

The apparatus also has an instruction controller operatively coupled with the electronic interface. The instruction controller is configured to identify a set of the cutting instructions associated with a particular feature of the given part, and to associate the error deviation(s) of the particular feature of the given part with the identified set of the cutting instructions. The apparatus further has an editor operatively coupled with the instruction controller. The editor is configured to edit the identified set of the cutting instructions to correct at least part of the error deviation(s) of the particular feature.

Illustrative embodiments of the invention are implemented as a computer program product having a computer usable medium with computer readable program code thereon. The computer readable code may be read and utilized by a computer system in accordance with conventional processes.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

DESCRIPTION OF ILLUSTRATIVE EMBODIMENTS

Figure 1:
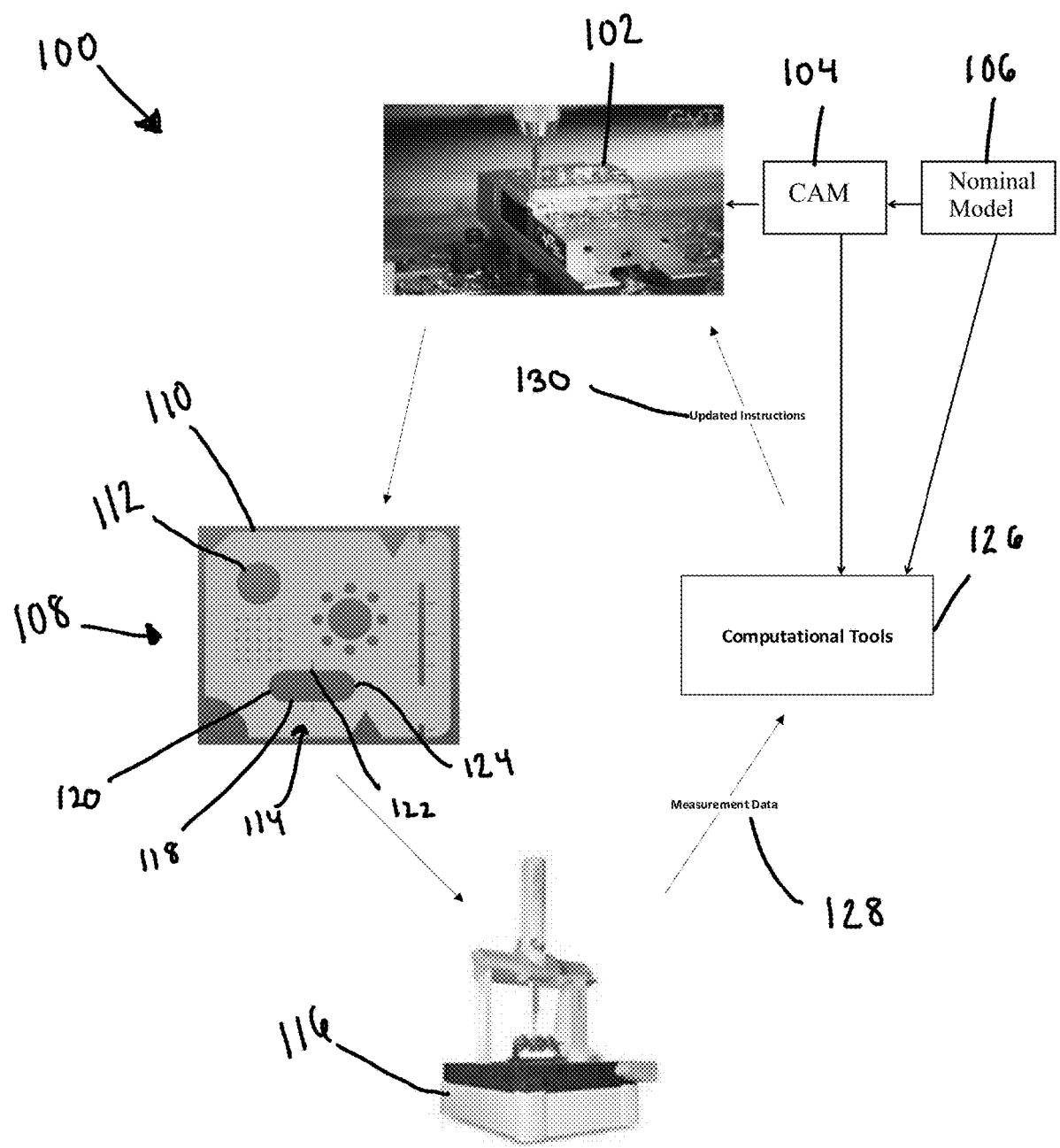
FIG. 1 schematically shows a system configured in accordance with illustrative embodiments of the present invention.

In illustrative embodiments, a method and apparatus for machining a plurality of parts corrects machining instructions based on deviation(s) of a machined part from a nominal model. In particular, an automated process associates data from the machining process itself to data from a subsequent inspection process of the machined part. As such, the process can better monitor and correct the machining process to account for deviations from the nominal model. This favorably helps the automated process both isolate problems in the machining process, and provide corrective actions to the machining process.

More specifically, a machine tool machines a given part based on a nominal model. The given part is then inspected and one or more error deviations from the nominal model are determined based upon features of the given part. Illustrative embodiments then edit the machining instructions based on the one or more error deviations to account for at least part of the deviation(s). A subsequent part can then be produced using updated machining instructions, which results in a machine part with reduced deviation(s) from the nominal model. Details of illustrative embodiments are discussed below.

As discussed above, Numerical Control (NC) cutting instructions (referred to interchangeably throughout this disclosure as "cutting instructions" or "machining instructions") for a machine tool define the steps necessary for a machine tool to machine a part. Often, the cutting instructions are based on a nominal model (e.g., a computer aided design model) or design intent for a particular part. Undesirably, however, driving a machine tool in accordance with its cutting instructions often results in a given part that deviates from the nominal model. For example, these results can deviate as a result of real-world conditions, dynamic forces on the machine tool, and specifications of a particular machine or machine tool at a given point in time.

This technical problem can be costly. This is especially true when manufacturing parts in an industry that requires parts with precise and repeatable specifications. Such industries may include the aerospace, defense, and medical industries. Additionally, this technical problem is exacerbated in situations where cutting instructions include a canned or pre-programmed instruction set for a particular common feature. For example, if a nominal model includes a circle feature, or a partial circle feature, most machine tools will have preprogrammed instructions to cut this known and common feature. In this instance, a user cannot adjust the underlying cutting instructions that define the cutting path of the circle, or other common feature. Rather, only specific characteristics (e.g., origin and size) can be altered. Accordingly, if a preprogrammed cutting instruction results in an error of form (e.g., the preprogrammed instructions are for a circle, but the resulting machined part is an ellipse), this error cannot be corrected by adjusting the cutting instructions associated with the preprogrammed part.

Accordingly, various embodiments of the invention present a solution that can be used to effectively and efficiently determine an error profile of a given part, identify deviation(s) from a nominal model, and edit machining instructions based on the error profile to correct for at least part of the deviation(s) from the nominal model. Subsequent parts can be machined using the edited machining instructions to produce parts with reduced deviation from the nominal model. In some embodiments, the technical solution can include measuring one or more deviation(s) of a particular feature of a machined part from a corresponding particular feature of a nominal model, and adjusting a set of cutting instructions associated with the particular feature of the machined part to correct for at least part of the deviation(s).

FIG. 1 schematically illustrates at a high-level a system 100 for carrying out exemplary embodiments of the present invention. More particularly, the system 100 can carry out a method of producing a machined part with a measurement-based correction of machining instructions. In some embodiments, the correction can be a feature-based (also referred to as a geometry-based) correction of the machining instructions. In such embodiments, the machining instructions can be adjusted based on measurements of specific features (or geometries) of a given part by a measuring device. For example, a feature can be a line, a circle, a cylinder, a plane, or standard geometry of a given part. In other instances, a feature can take on a non-standard geometry, such as a complex form, flowing, and/or organic type of shape.

It will be appreciated that, while discussion of various embodiments of the present invention above and below refer to cutting instructions, a machine tool, and process of cutting a given part, applicability of other embodiments of the invention is not limited to such scenarios. Rather, the methods, systems, apparatuses, and computer program products described throughout this disclosure can be used in any of a variety of other machining processes that produce a given part based on a nominal model or design intent, such as, for example, an additive manufacturing process.

To those ends, the system 100 includes a machine tool 102 that follows a prescribed cutting path when machining a part. The cutting path can be defined by cutting instructions, also referred to as "CAM 104", based on a nominal model 106. For example, the nominal model may be a conventional computer aided design (CAD) file and/or a data set listing a design intent of a part. Cutting instructions 104 based on the nominal model 106 drive the machine tool 102 to produce a given part 108. In some embodiments, a given part can be produced as a result of multiple cutting passes of the machine tool 102. For example, the given part 108 illustrated in FIG. 1 can include a first cutting pass that forms a perimeter 110 of the part 108, a second cutting pass that forms a circular feature 112, a third cutting pass that forms a shape 114, and so on. One having ordinary skill in the art will appreciate that a cutting pass is defined by a single continuous cutting motion of a machine tool, and that a given part can have any number of cutting passes (e.g., one, two, three, four, five, etc.).

The system 100 further has a measuring device 116 to measure the part 108. In one embodiment, the measuring device 116 can be a metrology device (e.g., a coordinate measuring machine, or "CMM") or other measuring device. The measuring device 116 can measure a finished part or in-process components of a part. The measuring device preferably makes "feature-based" measurements of the part. In other words, the measuring device can break a given machined part into a plurality of particular features, and then measure each of the relevant features. A single cutting pass of a machine tool can result in a single feature or in a series of particular features that blend into one another along the cutting path. For example, with reference to the part 106 of FIG. 1, shape 114 can be formed in a single cut pass of the machine tool and include four particular features, identified in FIG. 1 by reference numerals 118, 120, 122, and 124. More particularly, shape 114 is formed from two line features—118 and 122—connected to two partial circle features—120 and 124. In other instances, a single cut pass can result in a single feature, such as, for example circle 112.

Computational tool(s) 126, described in further detail below, can receive measurement data 128 (also referred to as "inspection data") of the given part 108 from the measuring device 116, the nominal file 106, and the cutting instructions 104. The computational tools 126 subsequently determine one or more error deviation(s) of a particular feature of the machined part 108 from the nominal model 106, and adjust the cutting instructions 104 to account for at least part of the error deviation(s). In other words, the computational tools 126 can use measurement data (e.g., metrology data from the CMM 116) in conjunction with cutting instructions and a nominal model, to associate the measurement data of a given part with the cutting instructions, identify deviation(s) from the nominal model associated with specific cutting instructions, and edit the cutting instructions accordingly. Updated cutting instructions 130 are provided by the computational tools 126 to the machine tool 102 to produce another part with, presumably, reduced error deviation(s) from the nominal file. Accordingly, the illustrative embodiments use feature based measurements to modify a prescribed cutting path of a machine tool to account for at least part of measured deviations from a nominal model.

Figure 2:
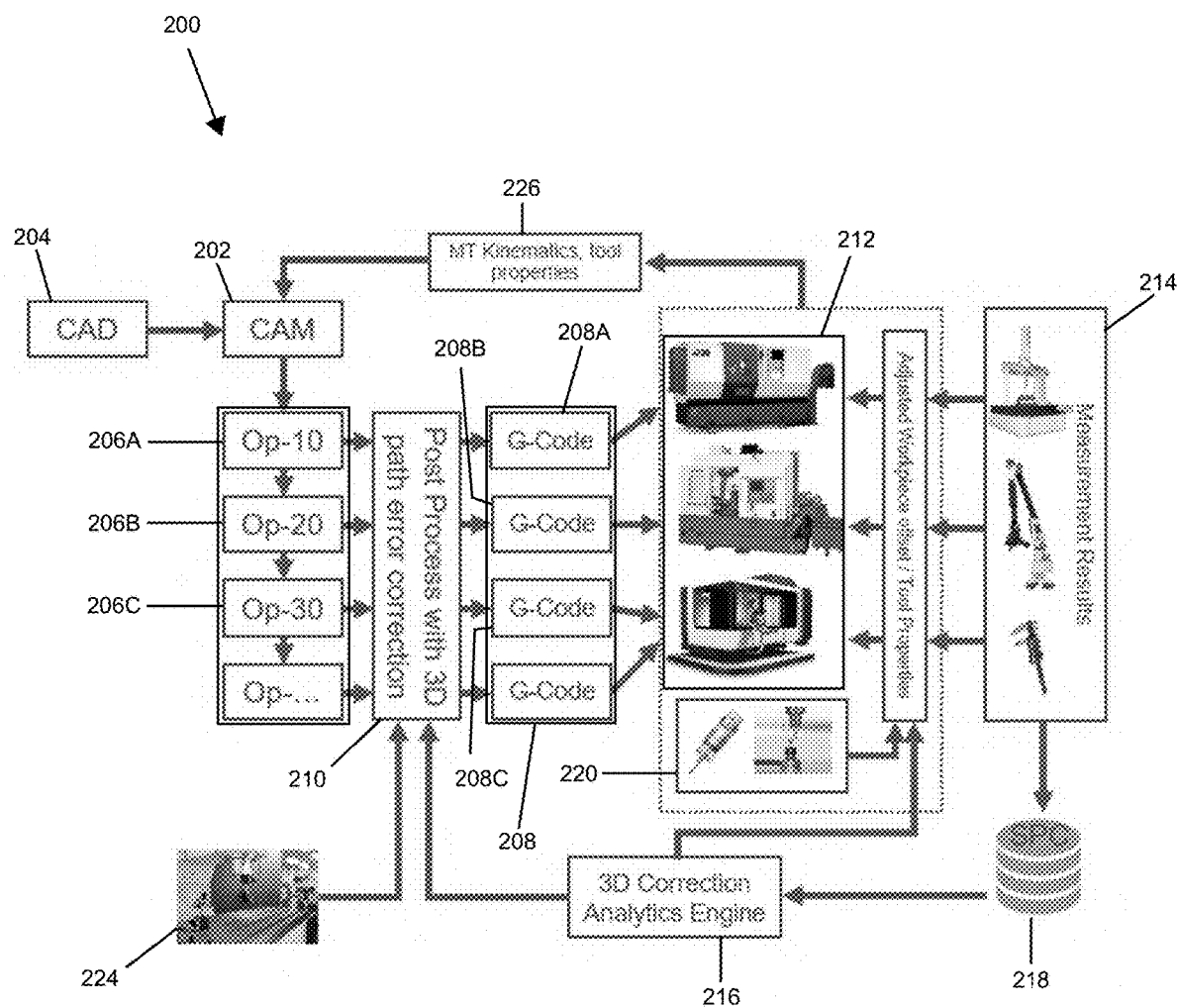
FIG. 2 schematically shows a system of machining a part including a feature-based correction in accordance with illustrative embodiments of the present invention.

FIG. 2 schematically illustrates a system 200 that incorporates an exemplary embodiment with a larger process of machining a part. As described in detail below, in some embodiments, a corrective, feature-based adjustment to a machine tool cutting path to account for one or more deviation(s) from a nominal model can be used in conjunction with other machine tool adjustment features, such as correcting a workpiece offset and/or correcting to account for tool properties. The feature-based correction of various embodiments is distinct from these other corrective measures, as such embodiments can iteratively determine an error of a given part from a nominal model and continuously adjust a cutting path by changing the cutting instructions themselves, rather than adjusting a machine part or a work piece offset location.

Figure 7:
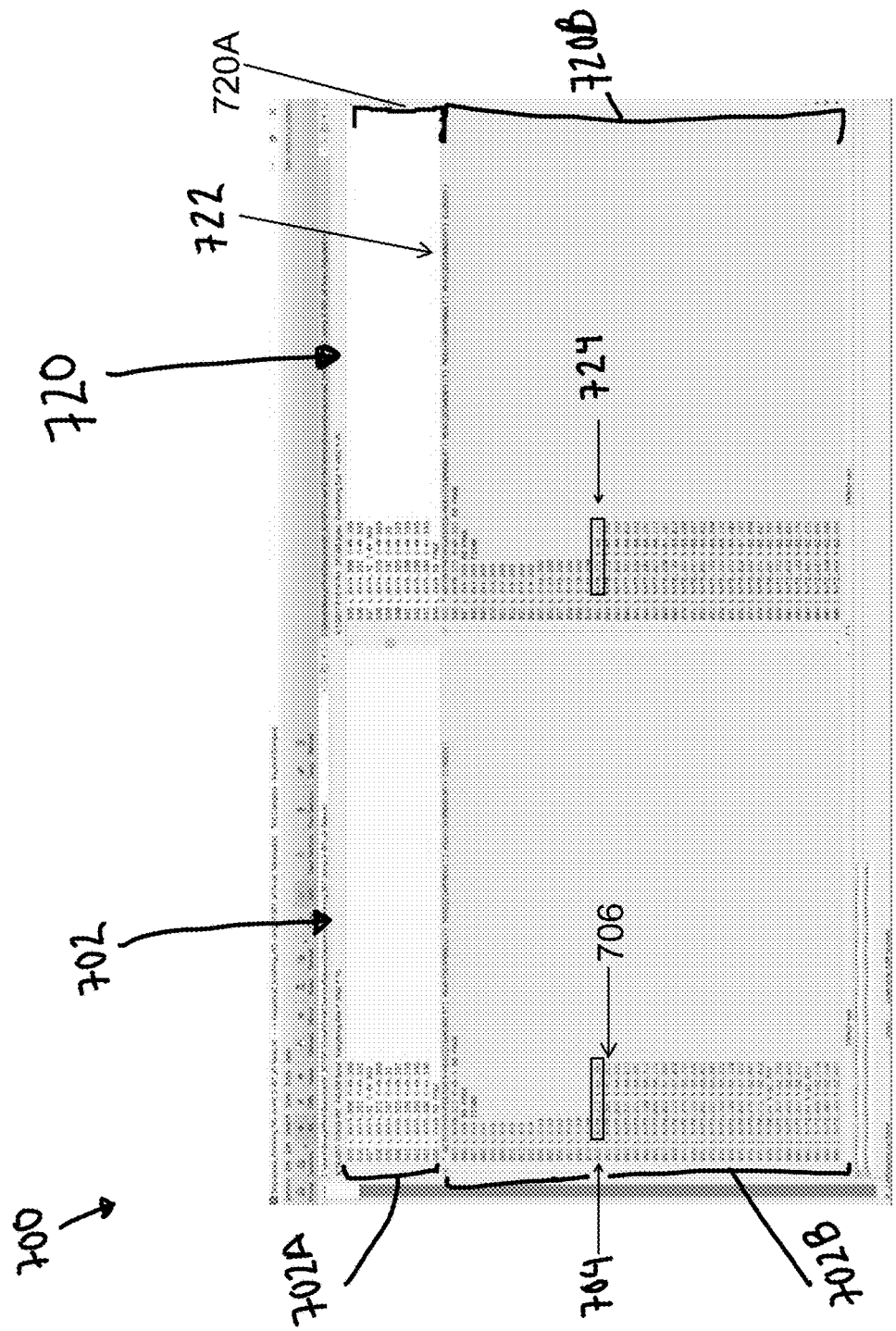
FIG. 7 schematically shows a screen-shot of a machining program instruction page and one exemplary embodiment of a portion of the invention.

A CAM path 202 based on the nominal model (e.g., a CAD model 204) establishes a tool path (e.g., a cutting path) of a machine tool 212. The CAM path 202 can also take into account information 226 received from a particular machine tool. The information 226 can include, for example, machine tool kinematics and/or tool properties. The CAM path 202 can include a plurality of tool operations. For example, a tool path defined by the CAM path 202 can include a plurality of distinct tool passes 206A-206C. The tool path established by the CAM path 202 is controlled by cutting instructions 208 for driving a machine tool. In some embodiments, the cutting instructions can include a particular segment that defines a particular tool pass. For example, tool passes 206A-206C can be defined by cutting instructions segments, such as G-code segments 208A-208C, respectively. As described in detail below, the cutting instruction segments can be manipulated by an editor 210 during a post processing step to account for at least part of one or more deviation(s) of a given part from a nominal model. In some embodiments, the cutting instructions can include a series of discrete points in a machine tool coordinate plane that direct the movement of a machine tool, where a cutting pass is defined by the series of discrete points. FIG. 7, described in detail below, illustrates an example of cutting instructions having a series of discrete points in a machine tool coordinate plane.

A machine tool 212 of the system 200 is driven by the cutting instructions to produce a given part based on the nominal model. The given part is then measured by a measurement tool, as discussed above and below. The measurement results 214 of the given part are sent to computational tools 216. In some embodiments, the measurement results 214 can be sent to a database, such as a Statistical Process Control database 218, and subsequently sent from the database to the computational tools.

In some embodiments, computational tools 216 can include a computational tool system configured to control various aspects of the method and the associated machines and apparatuses, and process data acquired from the same.

Figure 3:
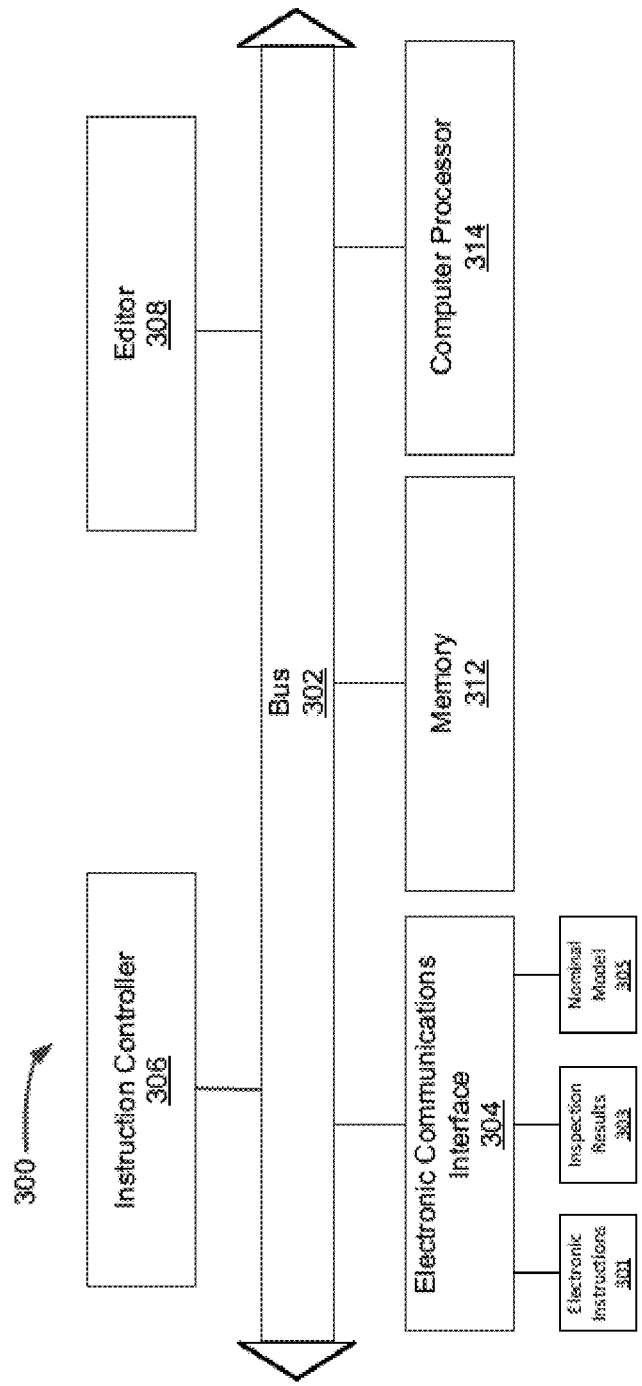
FIG. 3 schematically shows an embodiment of a controller of the invention.

FIG. 3 schematically illustrates an embodiment of a computational tool system 300 having several elements in electronic communication over a bus 302. In general, some or all of the elements may be implemented in one or more integrated circuits (e.g., as an ASIC), a gate array, a microcontroller, or a custom circuit. Some of the elements may be implemented in non-transient computer-implemented code capable of being executed on a computer processor 314.

Some embodiments include a computer processor 314, which may include a microprocessor available from Intel Corporation, or an implementation of a processor core, such as an ARM core. The computer processor 314 may have on-board, non-transient digital memory (e.g., RAM or ROM) for storing data and/or computer code, including non-transient instructions for implementing some or all of the control system operations and methods. Alternatively, or in addition, the computer processor 314 may be operably coupled to other non-transient digital memory, such as RAM or ROM, or a programmable non-transient memory circuit for storing such computer code and/or control data. Consequently, some or all of the functions of the computational tool system 300 may be implemented in software configured to execute on the computer processor.

The computational tool system 300 includes an electronic communications interface 304 configured to communicate with other parts of a machining system, for example with a machine tool and/or a measuring device (i.e., CMM machine), or with external devices such as a computer. To that end, the communications interface 304 may include various communications interfaces, such as an Ethernet connection, a USB port, or a Firewire port.

The communications interface 304 is operably coupled to one or more sources, such as a measuring device, computer, machine tool, etc. The communications interface 304 is configured to receive data, for example, one or more of electronic instructions 301 for producing a given part based on an electronic nominal model, inspection results 303 of the given part produced using the electronic instructions, the electronic nominal model 305, and machine tool information. The electronic instructions 301 can include a series of cutting instructions that coordinate a cutting path of a machine tool as a function of the electronic nominal model 305 of the given part. The inspection results 303 of the given part show one or more error deviations of the given part from the nominal part. Each error deviation of the inspection results is associated with a particular feature of the part as produced. The communications interface 304 is also coupled to other modules of the computational tool system 300 to provide to such other modules some or all of the data received by the interface.

The system 300 also has an instruction controller 306 configured to identify a set of the electronic instructions associated with a particular feature of the given part. The instruction controller 306 is also configured to associate one or more error deviation(s) obtained, for example, from the inspection results of the given part, with the identified set of the cutting instructions.

An editor 308 is configured to edit the identified set of the cutting instructions to correct at least part of the associated error deviation(s) of the particular feature. The editor 308 can produce updated cutting instructions that coordinate a cutting path of a machine tool to produce a given part with reduced error deviation(s) from a nominal model of the part, as compared to initial error deviation(s).

The computational tool system 300 is configured to produce the updated cutting instructions such that the machine tool can be driven in accordance with the updated cutting instructions. In some embodiments, the computational tool system 300 can output the updated cutting instructions to a database or memory 312 for storage and/or later use by a machine tool. The memory 312 can be configured to store the data received, processed, or output by the computational tool system 300 and any of the associated modules. The memory 312, which may include a non-transient memory, can be configured to store, among other things:

an electronic nominal model of a part,
a specification of a workpiece or machine tool,
initial cutting instructions that coordinate a cutting path to produce a given part based on the electronic nominal model,
inspection results of the given part,
an error map including one or more deviation(s) of the given part from the nominal part,
an inspection routine based on the electronic model, and
non-transient instructions executable on the computer processor 314.

The noted instructions may include, among other things, instructions for directing use of the electronic instructions for producing a given part, instructions for receiving inspection results of the given part produced using the electronic instructions, instructions for identifying a set of the cutting instructions associated with a particular feature of the given part and associating the identified cutting instructions with error deviation(s) of the particular feature, and/or instructions for editing the identified set of the cutting instructions to correct at least part of the error deviation(s) of the particular feature.

Returning to FIG. 2, the computational tool edits the cutting instructions to correct at least part of the one or more error deviation(s) of the part, and produces the updated cutting instructions to subsequently drive the machine tool.

As mentioned above, a feature-based correction of the cutting instructions can be used in conjunction with additional corrective measures. For example, in some embodiments, the machine tool 212 can receive measurement results 214, information from computational tools 216, and/or data from a machine tool probe or tool setter 220 to adjust a workpiece offset or machine tool properties. Additionally or alternatively, laser calibration equipment 224 can measure a machine tool itself and output error information to the cutting instructions. By way example, the laser calibration equipment can create a "volume-component error map" that can be downloaded into a machine tool controller or can be used to correct a tool path based on errors in the machine tool.

Figure 4:
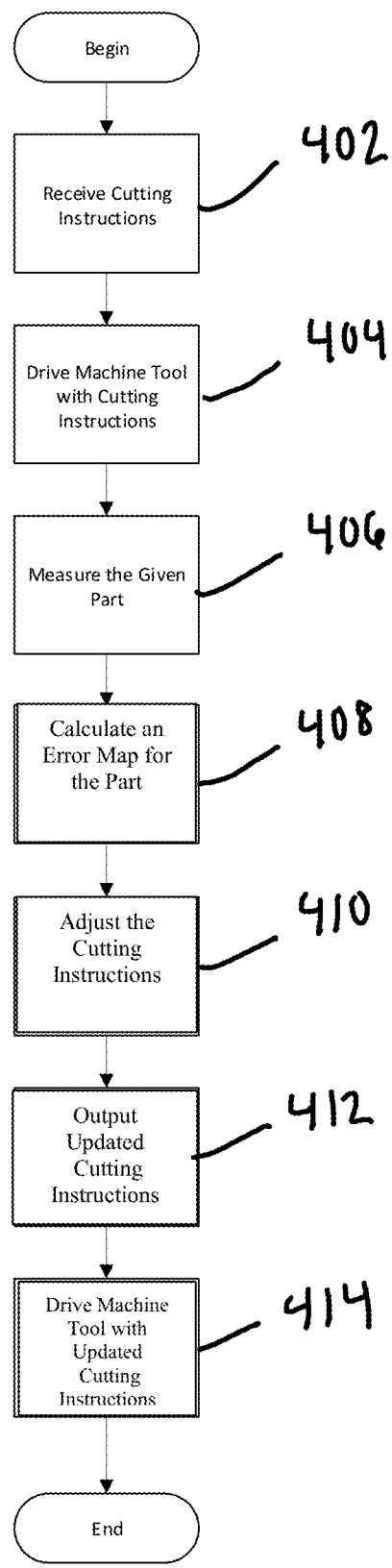
FIG. 4 shows a process of managing a part machining process in accordance with illustrative embodiments of the invention.
Figure 5:
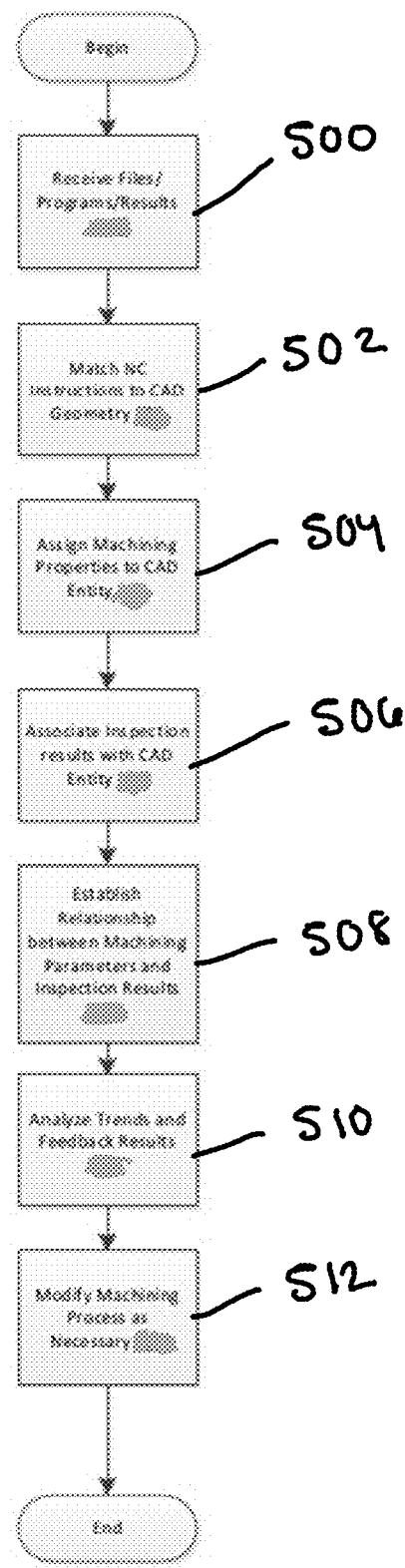
FIG. 5 shows a process of managing a part machining process that can be carried out by a computational tool system in accordance with illustrative embodiments of the invention.

FIGS. 4 and 5 show flowcharts schematically illustrating operations performed by a system (for example system 100 shown in FIG. 1) and/or apparatus (for example computational tool 300 shown in FIG. 3) in accordance with illustrative embodiments of the invention. The flowcharts illustrate a process of managing a part machining process in accordance with illustrative embodiments of the invention. It should be noted that the processes illustrated are substantially simplified from a longer process that normally would be used to machine the part. Accordingly, the process of machining the part likely has many steps that those skilled in the art likely would use. In addition, some of the steps may be performed in a different order than that shown, or at the same time. Those skilled in the art therefore can modify the process as appropriate. Moreover, as noted above and below, materials and structures noted are but one of a wide variety of different materials and structures that may be used. Those skilled in the art can select the appropriate materials and structures depending upon application and other constraints. Accordingly, discussion of specific materials and structures is not intended to limit all embodiments.

The process of FIG. 4 begins at step 402, with a machine tool receiving cutting instructions to produce a part based on a nominal model of the part. As discussed above, the cutting instructions can contain a plurality of lines of code that define one or more machine tool passes that result in production of a part based on a nominal model. More specifically, the cutting instructions can define a series of discrete points that coordinate a cutting path of a machine tool. Each of the discrete points has a coordinate set defined in a machine tool coordinate plane. As discussed above, one or more passes of a machine tool can be defined or coordinated by the cutting instructions.

FIG. 7 shows an exemplary portion of initial cutting instructions 702. Specifically, FIG. 7 shows a screen-shot of a program showing a portion of initial cutting instructions 702, and a portion of updated cutting instructions 720 in accordance with one example that correspond to the initial cutting instructions 702. As shown, the exemplary portion of the cutting instructions comprises a series of lines of code, spanning from code line number 835 to code line number 885. Each line of code coordinates a discrete point, defined in a coordinate plane of the machine tool, along a cutting path. For example, reference numeral 704 of FIG. 7 refers to a single line of code, line number 860. This particular line of code defines a discrete point having an x-coordinate of +78.412 and a y-coordinate of −65.204. A subsequent line of code, line number 861 (indicated by reference numeral 706 in FIG. 7), defines a discrete point having an x-coordinate of +78.206 and a y-coordinate of −56.015. Accordingly, these two particular lines of code instruct a machine tool to move from the discrete point defined in code line number 860 (indicated by reference numeral 704) to the discrete point defined in code line number 861 (indicated by reference numeral 710).

In this manner, the initial cutting instructions coordinate a cutting path by instructing a machine tool to move along a series of discrete points as defined in the cutting instructions. It will be appreciated that the portion of cutting instructions shown in the screen-shot of FIG. 7 represents only a portion of a cutting instructions. The initial cutting instructions can include any number of lines of code and can define any number of machine tool passes to produce a part. For example, and as explained in further detail below, the portion of the cutting instructions shown in FIG. 7 coordinate portions of two distinct machine tool paths, with code lines 835-844 of the initial instructions coordinating a portion of a first machine pass 702A and code lines 845-885 of the initial instructions coordinating a portion of a second machine pass 702B.

Turning back to FIG. 4, after receiving cutting instructions, the machine tool is driven with the cutting instructions to produce a given part (step 404). The given part is then measured by a measurement tool (step 406). More specifically, the part can be measured by measuring at least one particular feature. As discussed above, the cutting path of a single machine tool cutting pass can result in one or more particular features along the cutting path, and a coordinate measuring machine can be used to measure the one or more particular features.

Figure 6:
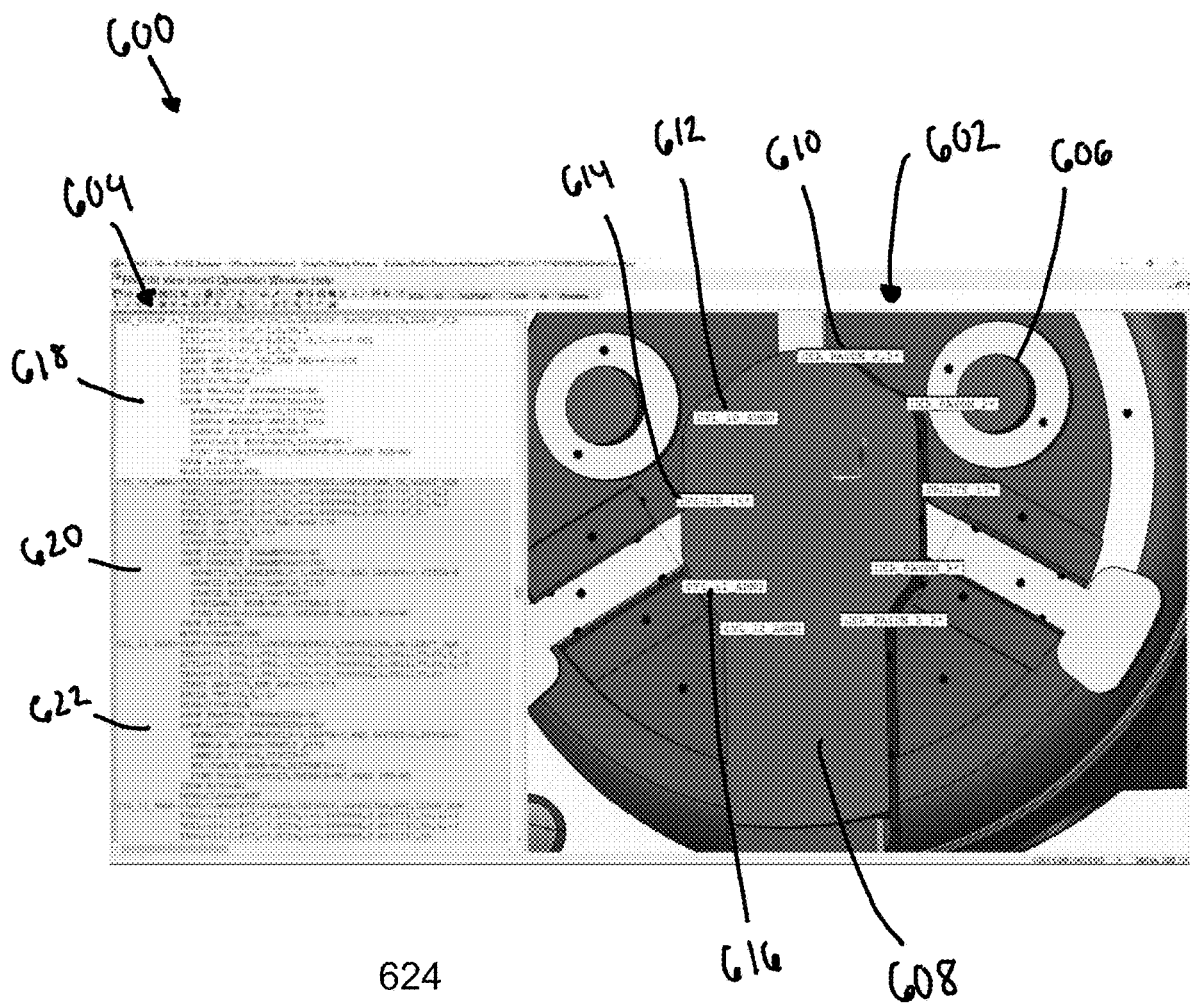
FIG. 6 schematically shows a screen-shot of a measuring device software and one exemplary embodiment of the invention.

The step of measuring the given part is explained in more detail with reference to FIG. 6. Specifically, FIG. 6 shows an exemplary screenshot 600 taken from a measurement software associated with a coordinate measuring machine. By way of example, the software can include PC-DMIS CMM of Hexagon Manufacturing Intelligence. The software can be used in conjunction with a CMM of Hexagon Manufacturing Intelligence. The screenshot 600 includes a part display 602 shown in a pane on the right side of the image, and an inspection results display 604 shown in a pane on the left side of the image. The inspection results display shows inspection results (i.e., measurement data) associated with the part shown in the part display. Measurements are taken by the CMM in a coordinate measuring machine coordinate plane (CMM coordinate plane).

Prior to measuring the given part, the measurement software can receive a nominal model of the part. An inspection routine can be planned prior to running the inspection routine on the measuring machine to measure the given part. For example, for a nominal model containing multiple components, with each component formed from a distinct cutting pass of a machine tool, an inspection routine can be planned on a component by component basis. For example, the part shown in the part display 602 of FIG. 6 includes, among other things, a first component 606 formed by a single cutting pass of a machine tool, and a second component 608 formed by another single cutting pass of the machine tool. As illustrated, the first component 606 is formed from a single particular feature, in this case a circle, while the second component 608 is formed from a plurality of particular features. More specifically, the second component can include, among other particular features, a circle feature 610, a cylinder feature 612, a line feature 614, and another cylinder feature 616. Accordingly, using a nominal model of the part, an inspection routine can be created that instructs the measuring device to sequentially measure the particular features of the component.

With a planned inspection process based on a nominal model, the measuring device then runs the inspection process on the given part machined based on the nominal model. Inspection results can be displayed and/or output for further processing. For example, the inspection pane 604 shows code presenting the inspection results (i.e., measurement data) associated with a particular feature of the given part, and more specifically, of a component created with a single machine tool pass. For example, inspection pane 604 shows inspection results 618 of the circle feature 610, inspection results 620 of the cylinder feature 612, and inspection results 622 of the cylinder feature 616. Inspection results display measurement data for each of the particular measured features. As will be discussed in detail below, the inspection results can be output using, for example, a line of code 624 that captures inspection results and the associated particular feature.

Returning to the machining process in FIG. 4, at step 408, the method calculates an error map for the given part. The error map is created by determining one or more error deviation(s) between the given part, using the inspection results, and the nominal model. More specifically, and as described in detail below with reference to FIGS. 5 and 11, an initial deviation can be determined by calculating the difference between the inspection result of at least one particular feature of the given part with a positioning of a corresponding at least one particular feature of the nominal model. Moreover, an initial deviation can be calculated for each of a plurality of discrete points along the at least one particular feature. The initial deviation can be determined with respect to the CMM coordinate plane. These calculations can be performed by the computational tool system 300 and/or by the measuring device sent to the computational tool system 300 via the electronic communications interface 306 for further processing. The initial deviation (i.e., an error deviation) can include an error magnitude and an error direction, representing the direction of the deviation of a measured point of given part from the corresponding point on the nominal model.

At step 410, the cutting instructions can be adjusted by editor 308 based on the error map to correct for at least part of the one or more error deviation(s). More particularly, a set of the cutting instructions associated with cutting a particular feature can be adjusted based on a corresponding one or more error deviation(s) of the particular feature, to correct for at least part of the corresponding error deviation(s). As discussed below with respect to FIG. 5, the instruction controller 306 can correlate a particular error deviation with a corresponding set of the cutting instructions, i.e., one or more lines of cutting instruction code responsible for coordinating a machine tool path that machines the point or particular feature of the particular error deviation measurement. Accordingly, in some embodiments, adjustments to the cutting instructions can include adjusting at least one coordinate set of the cutting instructions to compensate or negate at least part of the one or more error deviations associated with the coordinate set of cutting instructions. As described in further detail below, in some embodiments, the instruction controller 306 can use the nominal model 305 to associate inspection results 303 of a particular feature with a set of the cutting instructions 301 that coordinate the cutting path of that particular feature.

By way of example, the editor 308 can adjust the cutting instructions 301 by editing the cutting instructions with a line of code that associates the inspection results of a particular feature with the cutting instruction(s) responsible for that particular feature. For example, the ADJUSTPATHFEATURES code illustrated in FIG. 6 (indicated by reference numeral 624) can capture the inspection results and error deviation(s) of each particular feature along a particular cutting path. Referring to the updated cutting instructions 720 shown in FIG. 7, an ADJUSTPATHFEATURES code has been added to the cutting instructions in new code line 845 (indicated by reference numeral 722) in the pane on the right side of the image containing updated cutting instructions 720. The ADJUSTPATHFEATURES code captures the inspection results and error deviation(s) of each particular feature of the second cutting pass (indicated by reference numeral 702B in the initial cutting instructions and reference numeral 720B in the updated cutting instructions) and adjusts the cutting instructions accordingly on a line-by-line basis. For example, code line 861 of the updated cutting instructions (indicated by reference numeral 724) corresponds to code line 860 of the initial cutting instructions (indicated by reference numeral 704). Comparing the two lines of code, code line 861 of the updated cutting instructions (reference numeral 724) includes an adjusted coordinate point to compensate for at least part of an associated error deviation(s). More specifically, the code line 861 of the updated cutting instructions (reference numeral 724) defines a discrete point having an x-coordinate of +78.378 and a y-coordinate of −65.165. This reflects an x-coordinate adjustment of −0.034 and a y-coordinate adjustment of −0.039 from the corresponding initial cutting instruction of code line 860 (reference numeral 704). It will be appreciated that this single line of cutting instructions code is used merely as an exemplary explanation. As can be seen from FIG. 7, adjustments are made in the updated cutting instructions 720 on a line by line, i.e. point by point, basis as a result of editing the cutting instructions to take into account the one or more deviation(s) of the given part from the nominal model.

As discussed above, the cutting instructions shown in the screen-shot 700 include portions of a first cutting pass 702A/720A and a second cutting pass 702B/720B. To maintain cut continuity of a single cut pass, measurements and adjustments are preferably performed on a single cut pass basis. As can be seen, the ADJUSTPATHFEATURES code (indicated by reference numeral 722) corresponds only to the second cutting pass 702B/720B. Moreover, the ADJUSTPATHFEATURES code includes all of the particular features that form the single cut pass into a single command line. In this way, cut continuity of a single cut pass can be maintained as a series of particular features blend into one another to form the continuous cut path of the single cut pass. Accordingly, only the cutting instructions corresponding to the second cut pass (i.e., code lines 845-885 of the initial cutting instructions and code lines 846-886 of the updated cutting instructions) are adjusted, while the cutting instructions corresponding to the first cut path (i.e., code lines 835-844 of the initial cutting instructions and code line 835-844 of the updated cutting instructions) remain unchanged.

Figure 8:
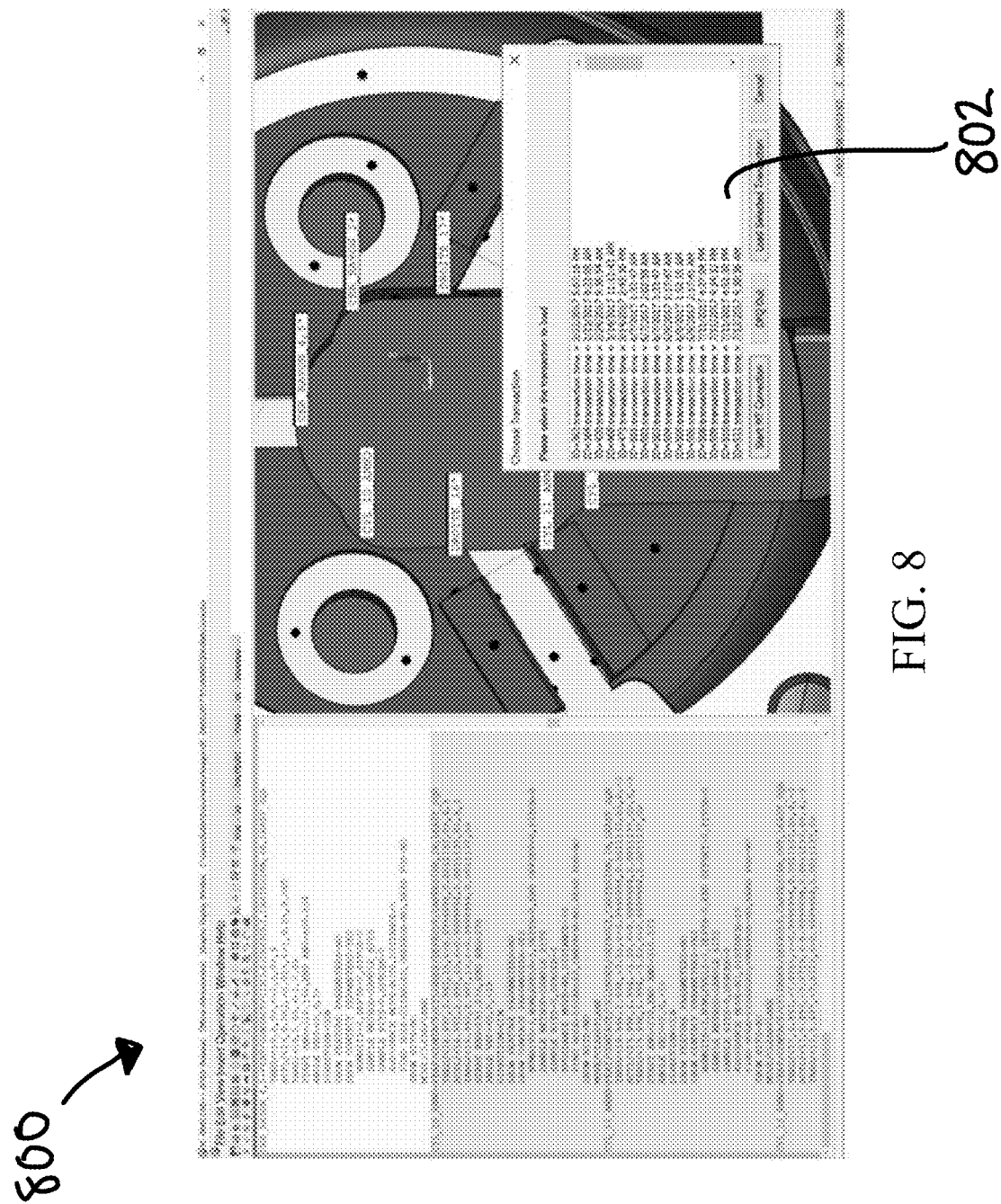
FIG. 8 schematically shows another screen-shot of a measuring device software in illustrative embodiments.

In some embodiments, inspection results from a plurality of given parts machined can be used to determine average amounts of one or more error deviation(s) from the nominal model. The cutting instructions can then be adjusted based on the average one or more error deviation(s) to produce a given part with reduced deviation for the nominal model. As shown in the screenshot 800 of measurement software in FIG. 8, a transaction selection box 802 can be used to select inspection results from a plurality of measurement runs. Each line entry in the transaction selection box references inspection result data from a single measurement run on a given part. With a plurality of measurement runs selected, the inspection data (i.e., measurement data) can be averaged across the plurality of runs. The average measurement data can then be used in the same manner as described above to edit associated cutting instructions to correct for at least a portion of one or more error deviation(s) of the averaged data from the nominal model.

Returning to the method of FIG. 4, at step 412 the method outputs updated cutting instructions and drives the machine tool with the updated cutting instructions (step 414). The electronic interface 304 can output the updated cutting instructions directly to a machine tool, and the processor 314 can drive the machine tool in accordance with the updated cutting instructions. Additionally or alternatively, the updated cutting instructions can be stored in memory 312 for later reference and/or use.

Figure 9:
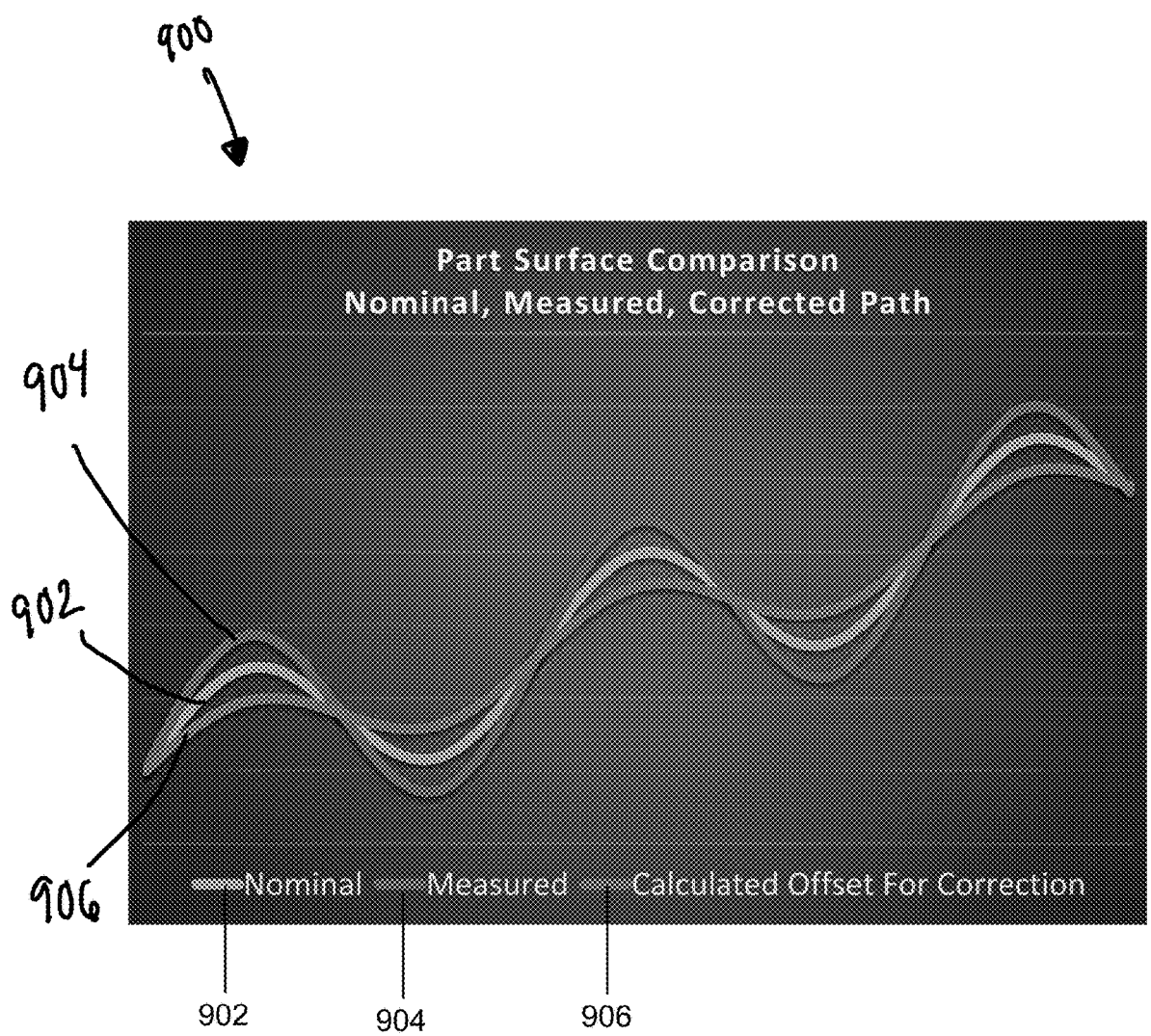
FIG. 9 schematically illustrates cutting paths of a machine tool in accordance with an embodiment of the present invention.

FIG. 9 schematically illustrates on a graph 900 the result of a feature-based correction to a cutting path in accordance with illustrative embodiments of the invention. The graph 900 plots three cut paths:

a cut path coordinated by the cutting instructions based on the nominal model (the line indicated by reference numeral 902),
  an actual cut path of a machine tool, determined by a measuring device measuring a given part (the line indicated by reference numeral 904), and a calculated cut path of the machine tool driven with updated cutting instructions, as determined by the measuring device measuring the given part (the line indicated by reference numeral 906).

As the graph shows, each discrete point along the nominal path 902 has a corresponding point along the initial measured path 904. The graph 900 illustrates that the machine tool in this case magnifies both the peaks and valleys of the nominal cutting path. At points where the measured path 904 deviates from the nominal path 902, an error deviation can be calculated and cutting instructions can be adjusted to correct at least part of the associated error deviation, as discussed above and below. Accordingly, the updated machine tool path 906 driven by the adjusted instructions produces reduced deviation from the nominal path 902, minimizing the magnification of both the peaks and the valleys, and more closely conforms to the nominal path than the previously measured cutting path 904.

It will be appreciated that the feature-based correction process illustrated in FIG. 4 can be repeated multiple times to iteratively correct a machine tool cut path based on error deviation(s) of a given machine part from a nominal model to achieve a tool cut path that results in a machined part with reduced error deviation(s) from the nominal model.

FIG. 5 shows part of an exemplary process that can be performed, for example, by an automated process of the computational tool system 300 to carry out feature-based correction. In particular, the method illustrated in FIG. 5 can associate, using an automated process, a) the machining program (e.g., cutting instructions) with data in an electronic nominal model, b) active machining properties of the machining program and associated machine tool(s) with data in the nominal model, and/or c) the inspection results with data in the nominal model.

The method establishes, using the automated process and at least one of the noted associations, a relationship between the machining program parameters (e.g., cutting instructions) and the inspection results, and then identifies, using the associated information and the automated process, a set of the machining program parameters (e.g., cutting instructions) responsible for producing a particular feature and the inspection results associated with that particular feature. The method then can modify the machining process for use when machining subsequent parts, such that the updated machining process produces a part that more closely matches the nominal model.

The automated program can identify, from the cutting instructions and/or machining program, some or all of the following: cutting instruction line numbers that are responsible for cutting a given part or a particular feature of a given part; a tool number identifying a tool; a tool geometry (e.g., side or end); the machine feed rate; the machine spindle speed; and the active work offset.

Using the data received and the relationships established, the automated program can thus identity, from the inspection results, characteristic dimensions pertaining to a particular given part machine from a nominal model (i.e., the CAD model). The automated program can compare the characteristic dimensions of a particular feature from the inspection results to the nominal model to calculate one or more deviation(s) from the model. The automated program can populate an inspection database with machining properties (i.e., cutting instructions) for each particular feature of a given part, and associate the calculated one or more deviation(s) of the particular feature to a corresponding cutting instruction(s).

In other embodiments, a method may make associations by fitting instructions of a machining program to a nominal file, and/or overlaying three-dimensional locations of the inspection results with the nominal file, and subsequently associating the fitted instructions of the machining program to the inspection results.

The process of FIG. 5 begins at step 500, in which the electronic communications interface 304 receives as input an electronic nominal model 305 (e.g., a CAD file of a nominal part), the electronic cutting instructions (NC) program 301 to machine that part, and the inspection results 303 of a given part machined using the cutting instructions. Note that rather than using a CAD file, some embodiments simply may input information or specifications relating to the nominal or idealized part. Next, at step 502, the instruction controller 306 matches the cutting instructions 301 to the CAD geometry of the nominal model 305. To that end, in illustrative embodiments, the automated program geometrically fits the cutting instructions to the CAD file. This preferably requires an understanding of the machine tool geometry and the machine tool code, and fits the overall cutting path to the CAD part. The fitting allows the instruction controller 306 to isolate which lines of NC code are responsible for cutting each CAD face by matching cutting instructions with nearby CAD geometry. More particularly, the instruction controller can identify a specific coordinate set in the machine tool coordinate plane (as defined by the cutting instructions) to a discrete point of a particular feature of the CAD part. This identifies times when certain cuts will be made during the machining process and specific cutting instructions that are responsible for each cut, feature, and discrete point.

The instruction controller 306 then assigns machining properties to the CAD entity (step 504). Specifically, the automated program queries the cutting instructions for the active machining properties at the time that a given CAD entity is being machined. Those are the machining properties to be assigned to the individual CAD entity.

At step 506, the instruction controller 306 associates inspection results 303 with the CAD entity 305. As noted above, the part may have been inspected by any of a variety of different inspection modalities, such as a coordinate measuring machine. The instruction controller 306 can accordingly associate measurements of a particular feature of the machined part with coordinates of the corresponding particular feature of the nominal model 305. In some embodiments the inspection results can include an error deviation that has already been calculated for a particular point or feature of the given part with respect to a corresponding part or feature of the nominal model. In other embodiments, the computational tool system 300 can calculate the error deviation given the measurement data of the particular point or feature of the given part and the corresponding nominal model. Accordingly, associating the inspection results can more particularly include associating an error deviation of a particular feature or point of the machined part with a corresponding feature or point of the nominal model.

Among other ways, the inspection results may be associated with individual CAD entities by overlaying 3-dimensional locations of the inspection results (i.e., 3-dimensional inspection data) with the CAD file. In other embodiments, the inspection results may be associated with individual CAD entities by overlaying and/or otherwise using 2-dimensional and 1-dimensional locations of the inspection results (or other data). The 3-dimensional inspection data may have been retrieved from an inspection database or other storage mechanism. Relative location and feature type algorithms may be used to associate inspection results with CAD entities.

The process continues to step 508, in which the instruction controller establishes a relationship between the machining parameters (i.e., cutting instructions) and the inspection results. To that end, the process may match CAD entities with both sets of data. This information then may be stored in a database, such as a statistical process control database ("SPC database").

Step 510 then analyzes trends and feedback results, and forward the results to the machine tool or a person responsible for that machine tool. Among other ways, this step may use software associated with the SPC database to identify relevant trends suggestive of an issue with the machining process. For example, the SPC software can issue alarms about defects that are getting close to the acceptable limits. Illustrative embodiments therefore preferably automatically identify, among other things, machining operation, tools, cutting path, speeds, feeds, etc. that are at fault.

At step 512 the editor 308 can modifying the machining process as necessary, based on the prior steps, to update cutting instructions for machining other parts with less error. In particular, the editor 308 can perform any of the steps discussed above with respect to adjusting or editing the cutting instructions based on one or more associated error deviation(s) to correct at least part of the associated error deviation(s). For example, the editor 308 can, using the established relationship between the machining parameters (i.e., cutting instructions) and the inspection results, edit the cutting instructions to compensate for at least part of an associated one or more error deviation as set forth in the inspection results. More particularly, the editor 308 can edit a specific coordinate set of the cutting instructions 301 based on an associated error deviation (as associated by the instructions controller 306) to correct for at least a part of the associated error deviation. In one embodiment, the automated program can identify an error deviation associated with a particular cutting instruction (i.e., a particular line of a cutting instruction code), determine a particular correction offset equal to the magnitude of the error deviation but with a direction opposite the direction of the error deviation, and adjust the particular line of the cutting instruction by the corresponding correction offset. At this point, the process may make more of the same part with improved results by driving the machine tool with the updated cutting instructions.

Figure 10:
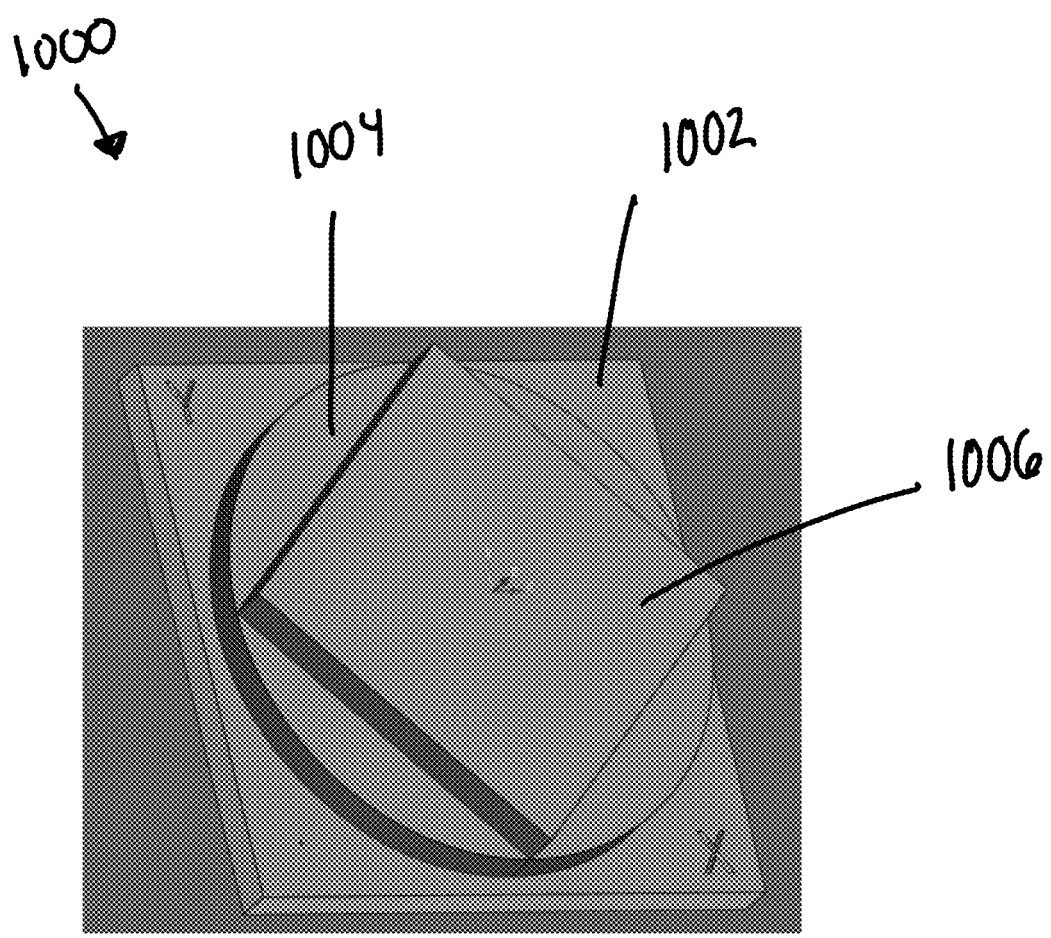
FIG. 10 schematically shows a sample part used in an exemplary use of one embodiment of the invention.
Figure 11:
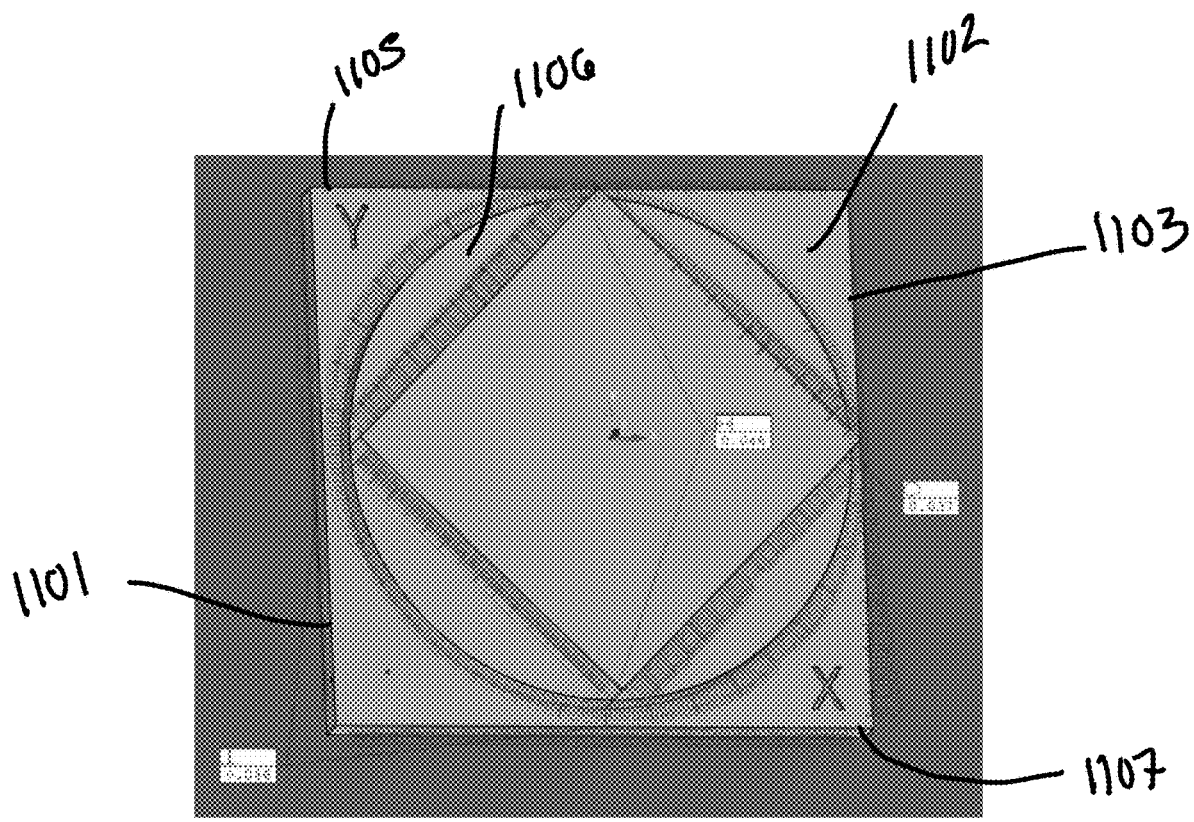
FIG. 11 schematically shows the sample part of FIG. 10 with an error map generated in accordance with one exemplary use of one embodiment of the invention.
Figure 12:
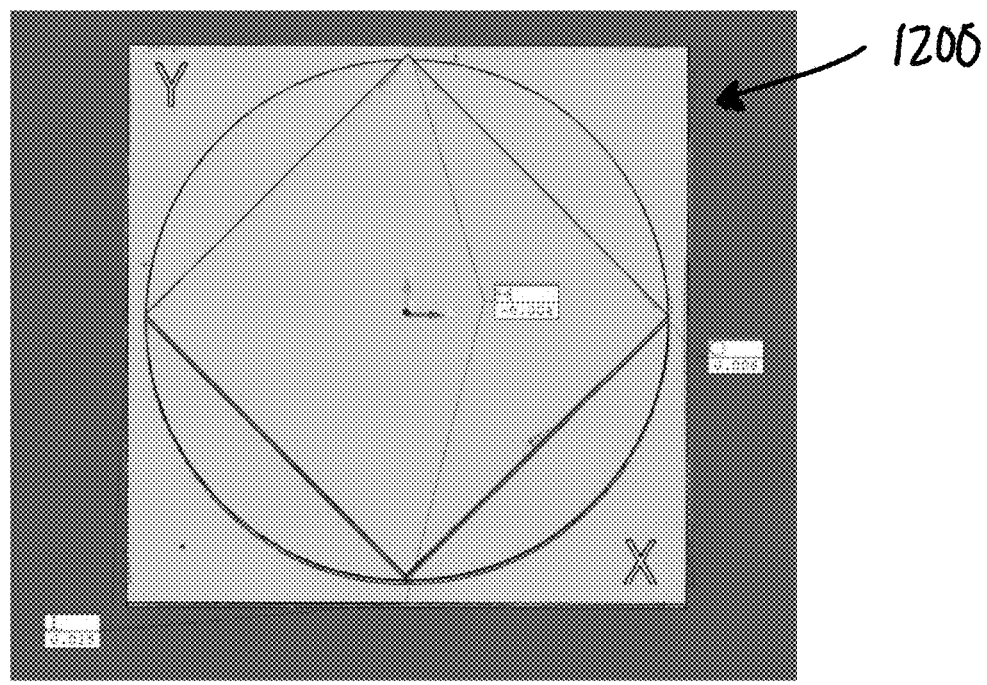
FIG. 12 schematically shows another sample part machined using updated cutting instructions with an error map generated in accordance with one exemplary use of one embodiment of the invention.

FIGS. 10-12 describe a test case of machining a plurality of parts using illustrative embodiments. Specifically, FIG. 10 schematically illustrates a sample part 1000. The sample part is a Circle, Diamond, Square ("CDS") part, which is currently used to test the volumetric accuracy of a machine tool. The sample part includes three components, a square component 1002, a circle component 1004, and a diamond component 1006. The basic geometric shapes are measured on a measuring machine, such as a coordinate measure machine, and if any measurements deviate from a nominal model of the sample part, the underlying error of the machine tool can be deduced. In this test case, a Mikron UCP 600 5-axis machine tool was used to machine the sample part, and a Micro Hite DCC CMM with PC-DMIS software was used to measure and analyze the sample part.

FIG. 11 schematically illustrates the Circle, Diamond, Square part of FIG. 10 with a corresponding error map overlaid on the part showing deviations from the nominal model. The error map includes a plurality of arrows, with each arrow representing a deviation of the given part from the nominal model of the part. More particularly, each individual arrow originating from the CDS part represents a direction and relative magnitude of an error for that particular point of the CDS part from a corresponding point of a CDS nominal model. An error deviation is preferably calculated for each of a plurality of discrete points that form a particular feature of the given part. More specifically, measurement data can be taken for each of the plurality of discrete points along a particular feature. The measurement data for each of the plurality of discrete points of the particular feature can then be compared to a corresponding discrete point of a corresponding particular feature in the nominal file to determine an error deviation. The error map, and the error deviations used to create the error map, can identity an underlying error of the machine tool that causes the deviation from the nominal model.

For example, by comparing a left side 1101 of the square component with a right side 1103 of the square component, it can be determined that the particular machine tool used to manufacture the part has a squareness error because the sides are not perpendicular. This can be seen by interpreting the error map associated with each of the two sides. Specifically, the error map of an upper portion of the left side (i.e., a portion of the side closer to the "Y" imprinted on a proximal face of the square) shows that the given part extends to the left beyond the boundary of the corresponding nominal model. While the error map of the right side shows that a lower portion of the right side (i.e., a portion of the side closer to the "X" imprinted on the proximal face of the square) extends to the right beyond the boundary of the corresponding nominal model in a direction, while an upper portion of the right-side deviates significantly less from the nominal model. The squareness error is also evident from the error map of the circle component 1106, which shows that the component 1106 extends radially outward beyond a corresponding feature of the nominal model in the upper left and lower right portions of the component 1106.

The error map shown in FIG. 11 also identifies a linearity issue with the machine tool. It is apparent that a length of the square component 1102 is too long by comparing the error map arrows (i.e., error deviations) along a top side 1105 of the square and a bottom side 1107 of the square. The error map illustrates deviations along the top and bottom sides, each over extending the boundaries of the associated component of the nominal file. In summary, this particular part has a calculated squareness error of 46 micrometers, a roundness error of 37 micrometers, and a length error of 46 micrometers. The cutting instructions can be updated to correct for at least a part of the associated error deviations.

FIG. 12 illustrates an example of a second CDS part 1200 machined using updated cutting instructions based on the error map as shown in FIG. 11. Once again, the measuring device measures the CDS part, and an error map overlays the part in FIG. 12. When comparing the error map of FIG. 12 to the error map of FIG. 11, it is apparent that the updated cutting instructions produced a part with a significantly reduced error deviation from a nominal model. More particularly, the various error metrics have been significantly reduced to a squareness error of about 15 micrometers, a roundness error of about 8 micrometers, and a length error of about 4 micrometers.

Figure 13:
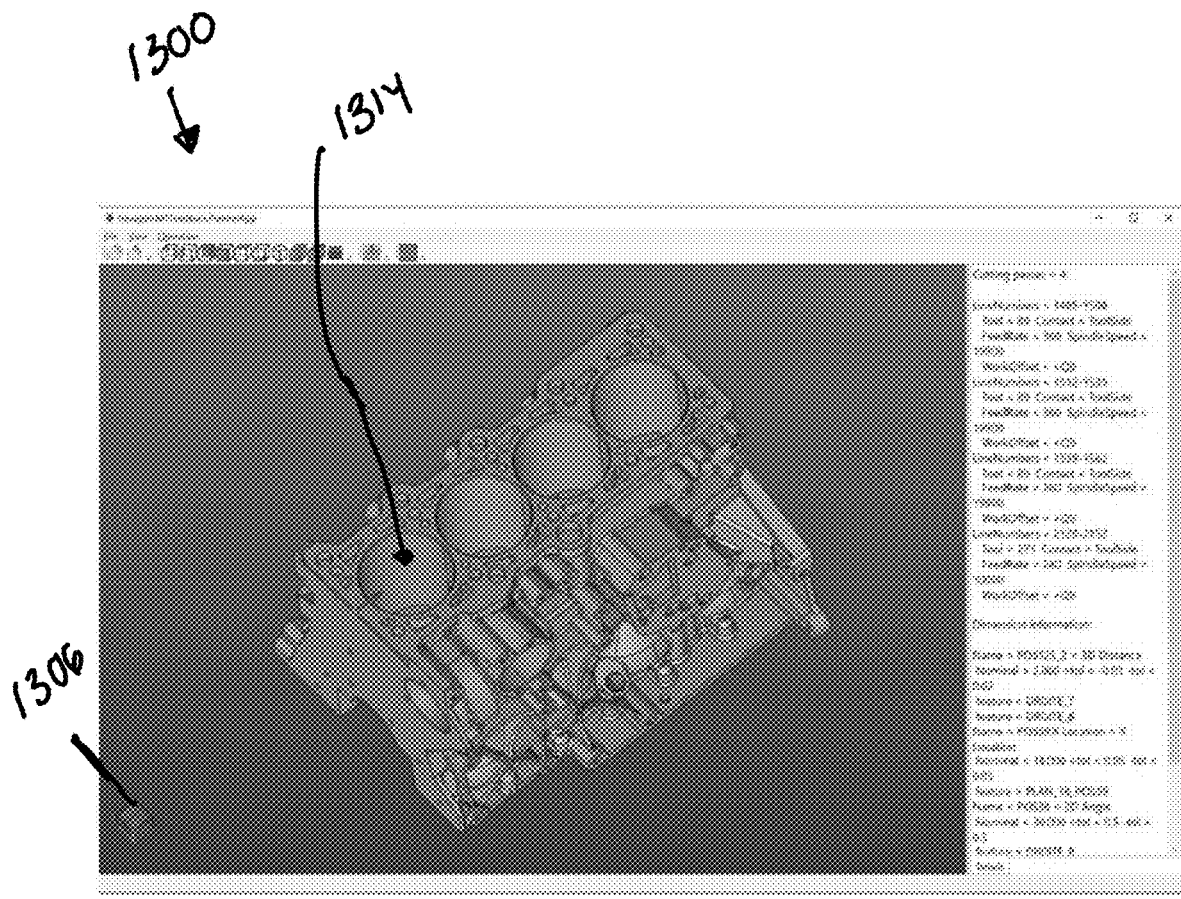
FIG. 13 schematically shows a screen-shot of a part and an exemplary use of one embodiment of the invention.
Figure 14:
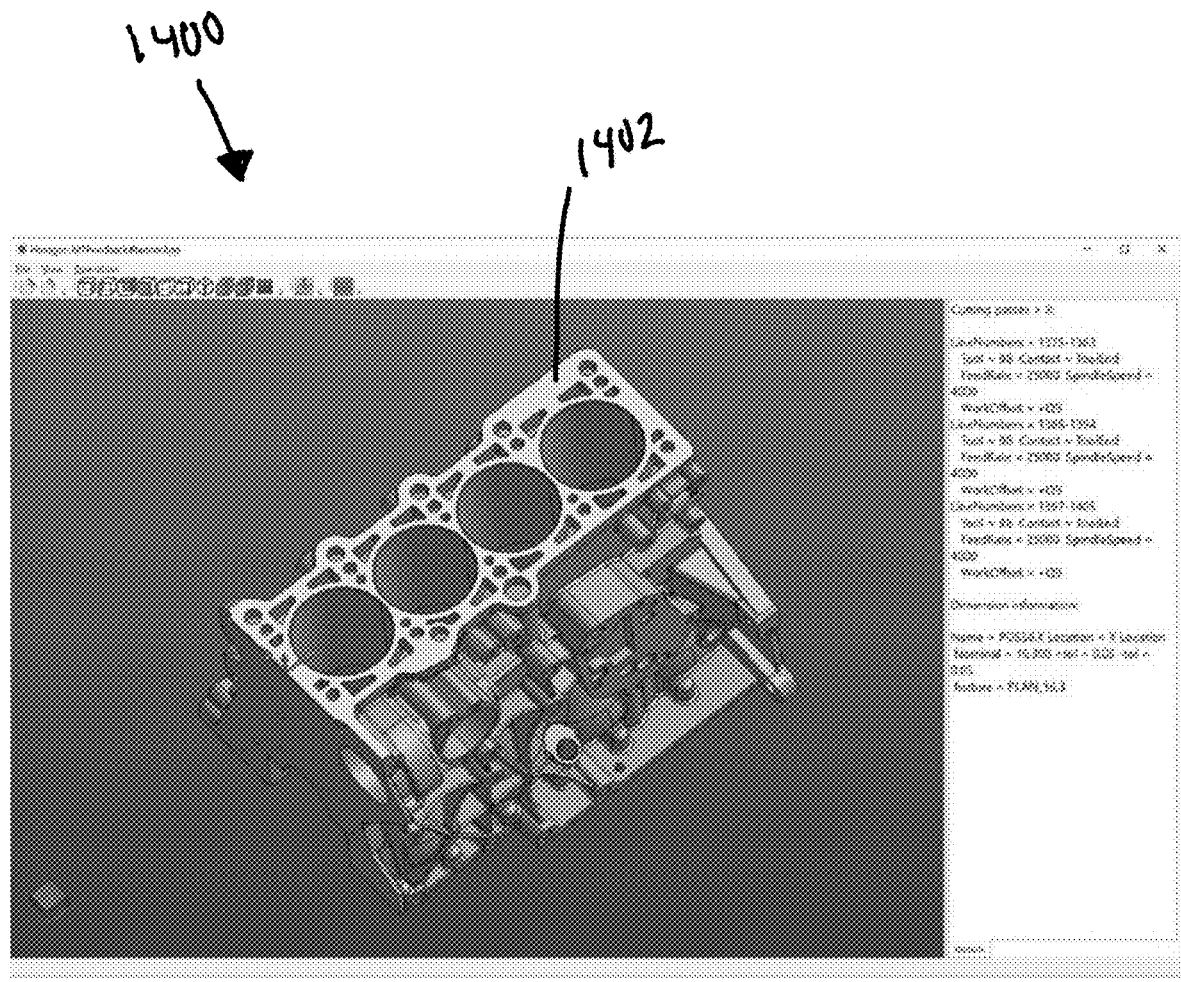
FIG. 14 schematically shows a screen-shot of the part of FIG. 13 and the exemplary use of one embodiment of the invention on another portion of the part.

FIGS. 13 and 14 show additional exemplary uses of various embodiments. FIG. 13 schematically shows a screen-shot 1300 of a part and an exemplary use of one embodiment of the invention. In this case, the part is an engine block. To generate this screen shot, a CAD file for the engine block (i.e., the nominal model for the part), the NC cutting instruction program (i.e., the machining program), and the inspection results of a given engine block machined using the NC cutting instruction program were inputted into the automated program. The user then selected the circular cylinder 1314 nearest the bottom of this figure. For reference purposes, this cylinder is adjacent to the three-dimensional axes 1306 also in the figure.

After the cylinder 1314 was selected, the faces of the cylinder were highlighted with visual indicia distinguishing it from other parts of the engine block, such as other cylinders. For example, the walls of the cylinder may be hatched, or highlighted with a prescribed color that is different from the colors of the other cylinders. Selection of this cylinder caused an automated computer program product to associate the CAD data, NC data (i.e., cutting instructions, also referred to as "CAM" data), and inspection data, which, among other things, populated the text column 1308 on the right of the engine block.

Among other things, the automated program can identify, from the NC cutting instructions, some or all of the NC instruction line numbers that are responsible for cutting the part, the tool number identifying the tool, the tool geometry, the machine feed rate, the machine spindle speed, and the active work offset. The automated program can thus identify, from the inspection results characteristic dimensions pertaining to the nominal model of an engine block. Finally, the automated program populates an inspection database with the cutting instructions for each particular feature.

FIG. 14 is another example of a process in which the user selected the top face 1402 of an engine block 1400 rather than a cylinder. In a manner similar to the display of FIG. 13, this selection causes the top face of the engine block to have unique identifying indicia as it generates the information on the right side of the display window pertaining to the top face of the engine block.

While FIG. 13 and FIG. 14 discuss application of various embodiments to an engine block, those skilled in the art will recognize that discussion of an engine block is a simple example. Other parts capable of being machined therefore may be used and thus, various embodiments are not limited to engine blocks.

Various embodiments of the invention may be implemented at least in part in any conventional computer programming language. For example, some embodiments may be implemented in a procedural programming language (e.g., "C"), or in an object oriented programming language (e.g., "C++"). Other embodiments of the invention may be implemented as a pre-configured, stand-along hardware element and/or as preprogrammed hardware elements (e.g., application specific integrated circuits, FPGAs, and digital signal processors), or other related components.

In an alternative embodiment, the disclosed apparatus and methods (e.g., see the various flowcharts described above) may be implemented as a computer program product for use with a computer system. Such implementation may include a series of computer instructions fixed either on a tangible, non-transitory medium, such as a computer readable medium (e.g., a diskette, CD-ROM, ROM, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some embodiments may be implemented in a software-as-a-service model ("SAAS") or cloud computing model. Of course, some embodiments of the invention may be implemented as a combination of both software (e.g., a computer program product) and hardware. Still other embodiments of the invention are implemented as entirely hardware, or entirely software.

The embodiments of the invention described above are intended to be merely exemplary; numerous variations and modifications will be apparent to those skilled in the art. Such variations and modifications are intended to be within the scope of the present invention as defined by any of the appended claims.

What is claimed is:

1. A method of manufacturing a plurality of parts, the method comprising:
   receiving cutting instructions to produce a part based on a nominal model of the part, the cutting instructions comprising a plurality of lines of code that define one or more machine tool passes;
   driving a machine tool with the cutting instructions to produce a given part;
   measuring the given part with a coordinate measuring machine by measuring at least one particular feature of the given part;
   calculating an error map of the given part by determining an initial deviation between the cutting instructions and the nominal model, the initial deviation being a function of the measured at least one particular feature of the given part and a corresponding at least one particular feature of the nominal model;
   adjusting the cutting instructions by editing at least one line of code from the plurality of lines of code that define the one or more machine tool passes based on the error map to obtain updated cutting instructions, the updated cutting instructions having a reduced deviation from the initial deviation with regard to the nominal model; and
   using the updated cutting instructions to produce another part.

2. The method of claim 1, the cutting instructions further comprise a series of discrete points that coordinate a cutting path of a machine tool, each of the discrete points having a coordinate set defined in a machine tool coordinate plane.

3. The method of claim 2,
   calculating the error map of the given part further comprises calculating the deviation of the measured at least one particular feature from the corresponding at least one particular feature of the nominal model in a coordinate measuring machine coordinate plane for each of the at least one particular features, and
   adjusting the cutting instructions based on the error map further comprises adjusting at least one coordinate set of the cutting instructions in the machine tool coordinate plane.

4. The method of claim 1, adjusting the cutting instructions further comprises:
identifying a particular set of the cutting instructions responsible for cutting the at least one particular feature of the given part; and
adjusting the particular set of the cutting instructions to compensate for at least part of the initial deviation of the at least one particular feature of the given part.

5. The method of claim 1 further comprising:
associating the at least one particular feature of the given part with a corresponding set of the cutting instructions using a relationship between the cutting instructions and the nominal model, and the measured at least one particular feature and the nominal model.

6. The method of claim 1, the initial deviation including an error deviation magnitude and an error deviation direction for each of a plurality of points making up the at least one particular feature of the given part.

7. The method of claim 1, wherein the lines of code comprise G-code, and wherein editing at least one line of code from the plurality of lines of code comprises editing said G-code.

8. A method of producing a machined part, the method comprising:
directing use of electronic instructions for producing a given part, the instructions comprising a series of cutting instructions comprising a plurality of lines of code that coordinate a cutting path of a machine tool as a function of an electronic nominal model of the part;
receiving inspection results of the given part produced using the electronic instructions, the inspection results showing one or more error deviations from the nominal model, each error deviation being associated with a particular feature of the given part as produced;
identifying a set of the cutting instructions associated with a particular feature of the given part;
associating the error deviation(s) of the particular feature of the given part with the identified set of the cutting instructions; and
editing at least one line of code from the plurality of lines of code of the identified set of the cutting instructions to correct at least part of the error deviation(s) of the particular feature.

9. The method of claim 8, directing use of the electronic instruction for producing the given part results in the given part having a series of particular features along the cutting path of the machine tool.

10. The method of claim 8, each error deviation includes an error magnitude and an error direction associated with a discrete point of the particular feature.

11. The method of claim 8, editing the identified set of the cutting instructions to correct for at least part of the error deviation(s) of the particular feature further comprises:
identifying a specific coordinate set of the cutting instructions responsible for forming a discrete point of the particular feature;
associating an error deviation of the discrete point of the particular feature with the identified specific coordinate set; and
editing the specific coordinate set of the cutting instructions to correct at least part of the associated error deviation.

12. The method of claim 8, wherein the lines of code comprise G-code, and wherein editing at least one line of code from the plurality of lines of code comprises editing said G-code.

13. A computer program product for use on a computer system for producing a machined part, the computer program product comprising a tangible, non-transient computer usable medium having computer readable program code thereon, the computer readable program code comprising:
program code configured for directing use of electronic cutting instructions for producing a given part, the cutting instructions comprising a plurality of lines of code that coordinate a cutting path of a machine tool as a function of an electronic nominal model of the part;
program code configured for receiving inspection results of the given part produced using the electronic cutting instructions, the inspection results showing one or more error deviations from the nominal model, each error deviation being associated with a particular feature of the given part as produced;
program code configured for identifying a set of the cutting instructions associated with a particular feature of the given part;
program code configured for associating the error deviation(s) of the particular feature of the given part with the identified set of the cutting instructions; and
program code configured for editing at least one line of code from the plurality of lines of code of the identified set of the cutting instructions to correct at least part of the error deviation(s) of the particular feature.

14. The medium of claim 13, the program code configured for directing use of the electronic instruction for producing the given part results in the given part having a series of particular features along the cutting path of the machine tool.

15. The medium of claim 13, each error deviation including an error magnitude and an error direction associated with a discrete point of the particular feature of the given part.

16. The medium of claim 13, the program code configured for editing the identified set of the cutting instructions to correct for at least part of the error deviation(s) of the particular feature further comprises:
program code configured for identifying a specific coordinate set of the cutting instructions responsible for forming a discrete point of the particular feature;
program code configured for associating an error deviation of the discrete point of the particular feature with the identified specific coordinate set; and
program code configured for editing the specific coordinate set of the cutting instructions to correct at least part of the associated error deviation.

17. The medium of claim 13, wherein the lines of code comprise G-code, and wherein editing at least one line of code from the plurality of lines of code comprises editing said G-code.

18. An apparatus for producing a machined part, the apparatus comprising:
an electronic interface configured to receive electronic instructions for producing a given part, the instructions comprising a plurality of lines of code that coordinate a cutting path of a machine tool as a function of an electronic nominal model of the part, the electronic interface also being configured to receive inspection results of the given part produced using the electronic instructions, the inspection results showing one or more error deviations from the nominal model, each error deviation being associated with a particular feature of the given part as produced;
an instruction controller operatively coupled with the electronic interface, the instruction controller configured to identify a set of the cutting instructions associated with a particular feature of the given part, the instruction controller also configured to associate the error deviation(s) of the particular feature of the given part with the identified set of the cutting instructions; and an editor operatively coupled with the instruction controller, the editor being configured to edit at least one line of code from the plurality of lines of code of the identified set of the cutting instructions to correct at least part of the error deviation(s) of the particular feature.

19. The apparatus of claim 18, the cutting instructions that coordinate a cutting path result in a given part having a series of particular features along the cutting path of the machine tool.

20. The apparatus of claim 18, each error deviation includes an error magnitude and an error direction associated with a discrete point of the particular feature of the given part.

21. The apparatus of claim 18, wherein the instruction controller is further configured to identify a specific coordinate set of the cutting instructions responsible for producing a discrete point of the particular feature, and to associate the error deviation of the discrete point of the particular feature with the identified coordinate set; and the editor is further configured to edit the specific coordinate set of the cutting instructions to correct at least part of the associated error deviation.

* * * * *